(12) United States Patent
Pont et al.

(10) Patent No.: US 8,230,270 B2
(45) Date of Patent: Jul. 24, 2012

(54) MONITORING DEVICE

(75) Inventors: Michael Joseph Pont, Great Dalby (GB); Kam Leung Chan, Leicester (GB)

(73) Assignee: University of Leicester, Leicester (GB)

( * ) Notice: Subject to any disclaimer, the term of this patent is extended or adjusted under 35 U.S.C. 154(b) by 29 days.

(21) Appl. No.: 12/599,792

(22) PCT Filed: May 9, 2008

(86) PCT No.: PCT/GB2008/001602
§ 371 (c)(1),
(2), (4) Date: Jun. 23, 2010

(87) PCT Pub. No.: WO2008/139156
PCT Pub. Date: Nov. 20, 2008

(65) Prior Publication Data
US 2010/0281298 A1    Nov. 4, 2010

(30) Foreign Application Priority Data

May 11, 2007   (GB) .................................. 0709113.5

(51) Int. Cl.
*G06F 11/00* (2006.01)

(52) U.S. Cl. ......... 714/47.1; 714/22; 713/300; 713/324; 713/340

(58) Field of Classification Search .................. None
See application file for complete search history.

(56) References Cited

U.S. PATENT DOCUMENTS

| 2005/0132105 A1* | 6/2005 | Hall et al. ...................... 710/36 |
| 2006/0037024 A1* | 2/2006 | Bodas ............................ 718/105 |
| 2006/0242463 A1* | 10/2006 | Yasui et al. ..................... 714/22 |
| 2007/0028129 A1* | 2/2007 | Schumacher et al. ........ 713/320 |

OTHER PUBLICATIONS

Paul Kocher, Joshua Jaffe, and Benjamin Jun, "Differential Power Analysis," Springer-Verglag Berlin Heidelberg, 1999, 10 pages, pp. 388-389.*

* cited by examiner

*Primary Examiner* — Scott Baderman
*Assistant Examiner* — Jason Bryan
(74) *Attorney, Agent, or Firm* — Goodwin Procter LLP

(57) ABSTRACT

The invention relates to a monitoring device for a processor comprising a means for monitoring the power consumption of the processor and a means for analysing the power consumption to detect abnormal operation of the processor.

10 Claims, 3 Drawing Sheets

MONITORING DEVICE

RELATED APPLICATIONS

This application is a U.S. National Stage of International Application Serial No. PCT/GB2008/001602, filed May 9, 2008, and claims priority to United Kingdom Patent Application No. 0709113.5, filed May 11, 2007, the disclosures of which are hereby incorporated by reference in their entireties.

FIELD OF THE INVENTION

This invention relates to a monitoring device. Particularly, but not exclusively, the invention relates to a monitoring device suitable for detecting task overruns in time-triggered embedded systems.

BACKGROUND TO THE INVENTION

Embedded processors are ubiquitous: they form a core component of a vast range of everyday items (cars, aircraft, medical equipment, factory systems, mobile phones, DVD players, music players, microwave ovens, toys etc). In some cases several embedded processors may be employed, each for a specific function. For example, a typical modern car may contain around fifty embedded processors.

In applications where predicable behaviour is an important consideration—such as in automotive systems, aerospace systems, medical systems, industrial systems, and in many brown and white goods—it is vital that a reliable system is used and that it operates in a highly predictable manner. This is important for safety considerations but also because a reliable device is likely to incur reduced maintenance and/or repair costs (and resulting inconvenience to the user) during its operational life. Thus, it is important that such systems are sufficiently robust and that faults are quickly and easily detected so that appropriate action can be taken.

A time-triggered (TT) embedded system is a real-time system that executes a set of periodic tasks. Various forms of TT architecture have been suggested, ranging from the simplest form of "cyclic executive" with co-operative task scheduling through to rate-monotonic architectures which employ pre-emption.

Of particular interest are TT systems which employ co-operative task scheduling. These systems are also referred to as "time-driven cyclic executive". Embedded systems which employ time-triggered co-operative (TTC) scheduling can have highly predictable patterns of behaviour, including very low levels of task jitter. When coupled with the fact that TTC implementations can have very low resource requirements, this architecture is an appropriate choice for cost-sensitive/safety-related applications, including automotive control.

Unfortunately, the behaviour of a TTC system may become unpredictable in situations where one or more tasks exceed their predicted "worst case" execution time (WCET). This situation is known as a task overrun. In hard real-time systems, task overrun may result in fatal consequences both for the system employed and, possibly, the user. Thus, a system-recovery mechanism is required and must be triggered immediately in response to such temporal constraint violations. In order to achieve this, it is necessary to continuously monitor the temporal behaviour of the system.

Over the last decades, much research has been focused on monitoring the run-time behaviour of real-time systems. The approaches taken can be classified into three categories:
  Hardware-based monitoring approach
  Software-based monitoring approach
  Hybrid monitoring approach.

These three approaches each have their pros and cons as discussed below.

Hardware-based monitoring involves non-invasive observation of the target system but is generally expensive and complicated. Additional hardware is required for the monitoring system, which is separate from the target system. The monitoring system generally comprises a complex architecture which connects to the target system and snoops for signals from its buses, memory system and input/output channels. The monitoring system then uses this information to imitate the target system and thereby discover its state. However, this approach requires sophisticated hardware, specifically tailored towards the target system. Moreover, it is difficult to measure signals from some buses or memory ports, due to the miniaturisation and integration of components in modern microcontrollers. Additionally, microcontrollers have a limited number of pins which may make the above approach infeasible.

Software-based monitoring, on the other hand, is cheap, simple and flexible. Instrumentation codes, also known as software sensors, are inserted at the points of interest in the software program of the target system. The software sensors are designed to record the status of the target system at those points of interest. However, this arrangement will produce some degree of interference with the run-time behaviour of the target system since the software sensors not only share resources with the target system but also inevitably increase the system's computational complexity. Many different techniques have been developed in an attempt to minimise the impact of this so-called 'Probe Effect' on the behaviour of the target system. One approach has been to build the monitoring system as a permanent part of the target system. This avoids having to remove the software probes with consequent distortion of the system's behaviour. Another approach suggests storing data values only if they cannot be reconstructed. In addition, it is suggested to use in-line software sensors instead of sensors that are called as functions. These two techniques can optimise the spatial and temporal aspects of the software monitoring approach. However, the probe effect of software monitoring cannot be completely eliminated simply because of its invasive nature.

The hybrid monitoring approach uses a combination of software and hardware monitoring and can alleviate some of the shortcomings of both approaches. In this approach, a software monitoring system captures events of interest in the target system and passes these to an external dedicated hardware device for further analysis. Consequently, this approach can minimise the probe effect caused by the software monitoring approach and can reduce the need for hardware connections to the target system. However, a specifically tailored hardware platform is still required with its attendant costs.

It is therefore an object of the present invention to provide a solution that ameliorates some or all of the aforementioned problems.

SUMMARY OF THE INVENTION

According to a first aspect of the present invention there is provided a monitoring device for a processor comprising:
  a means for monitoring the power consumption of the processor; and
  a means for analysing the power consumption to detect abnormal operation of the processor.

According to a second aspect of the present invention there is provided a method of monitoring a processor comprising the following steps:

monitoring the power consumption of the processor; and
analysing the power consumption to detect abnormal operation of the processor.

In a preferred embodiment, the step of analysing may include comparing a sample power consumption profile with a reference or expected profile. A trigger may be generated in response to a mismatch in the comparison, thereby indicating an abnormal operation. The trigger may be used for alerting a user or for rebooting part or all of the system.

From a processor perspective, a computer program is simply a sequence of instructions. The processor executes different instructions by applying or removing electrical charge to different sets of its logic gates. Thus, the energy consumed by the processor will depend on the instructions being carried out. It is possible, but highly unlikely that different sets of instructions will consume the same quantities of energy and so it is likely that the power consumption of the processor will vary over time when a computer program is being executed. Even if certain instructions do consume the same quantities of energy, it may be possible to determine if the processor is functioning correctly by comparing the actual power consumption to that expected by the system when operating correctly. Accordingly, the present invention can enable faults to be detected simply by observing the actual power consumption and comparing this to the expected power consumption. The comparison may be in terms of absolute values or, more generally, a pattern of power consumption over time.

Compared with conventional hardware-based monitoring methods, the present invention is much cheaper and simpler to implement since it does not require imitation of the target system or sampling of the status of various signals. However, it does preserve the non-invasive nature of a hardware-based monitoring system and so does not result in interference of the target system such as that caused by the probe effect of software-based systems.

Thus, instead of measuring the internal signals of a target system, the present invention exploits the power consumption of the processor to passively extract the system's temporal state.

Advantages of the present invention are that it provides a straightforward technique for the rapid detection of faults in a system. In addition, it can be used to monitor real-time behaviour without affecting the performance of the target system.

A single monitoring device according to the present invention may be compatible with a wide range of target systems since no changes are required to the target processor in order to monitor its power consumption.

The monitoring device of the present invention may further comprise means for alerting a user of abnormal operation.

Additionally or alternatively, the device may further comprise means for halting the processor, resetting the processor or initiating a system-recovery operation as a result of detection of abnormal operation.

The present invention is particularly useful for monitoring time-triggered systems since these generally involve periodic tasks to be performed by the processor and therefore the processor's power consumption is also likely to be periodic. This allows for simple detection of a fault when the system's power consumption is not periodic, as expected.

More specifically, embodiments of the present invention can be configured for use with time-triggered cooperative (TTC) processors where all tasks are configured to run until completion within a pre-determined tick interval and the processor is designed to return to an idle mode before the next tick. Typically, in this type of system, tasks are initiated by an Interrupt Service Routine (ISR) which is triggered periodically (i.e. on every clock tick). The ISR updates the timing information for each task and executes all tasks that are due to run in that tick interval. Each task is configured to run until it is completed before the next task due to run is initiated. All tasks that may be run in the same tick interval are configured to be complete before the end of the tick interval so that the processor can be placed in an idle mode to await the next ISR. Accordingly, in this embodiment of the present invention, the processor's power consumption should be periodically zero (or at least a minimum value) when it is in an idle mode and no tasks are being run or updated. If the power consumption is not periodically at such a minimum level, the processor is not working correctly (i.e. a task may have exceeded its WCET, leading to a tick overrun). The monitoring device can be configured to detect such a problem and to act accordingly. In this way, the power consumption of the TTC system's processor can be used for extracting its timing behaviour.

Thus, the present invention provides a simple non-invasive technique that can be used to detect task overruns in TTC embedded systems. The detection of such overruns is vital so that a system-recovery mechanism can be implemented.

In embodiments of the present invention, the power consumed by one or more peripheral components on the processor may be monitored—for example, an I/O port or an on-chip component such as an ADC converter.

Embodiments of the present invention may also be configured for use in systems including task pre-emption.

Since the present invention is particularly advantageous in monitoring task scheduling in processors it can be considered a Non-Invasive Scheduler Agent (NISA).

A processor's power consumption over time can be expressed as $P(t)=I(t) \times V(t)$ where P is the power consumed by the processor, I is the current flowing through the processor and V is the potential difference across the processor—all measured at time t. If, in an embodiment of the invention, the change in V in any time t is insignificant, V can be considered a constant. Thus, I(t) can be used to indicate the power consumption of the processor and to extract the temporal behaviour of the target system.

In accordance with the above, in a particular embodiment of the invention, the means for monitoring the power consumption of the processor may comprise measuring the potential difference (V) across a known value of resistor (R) which is in series with the processor's power input. The current (I) flowing through the processor can then be calculated from Ohm's Law ($I=V/R$). Over time, the change in I therefore provides an indication of the change in the power consumption of the processor. If this change is not as expected then it is likely that the processor is exhibiting abnormal behaviour.

The monitoring device may be used during system development as a debugging tool but it is also very useful for monitoring real-time systems.

More specifically, the present invention may be useful during system development/debugging, where it will provide a useful mechanism (for use on the bench or in the field) to ensure that the system is operating correctly (and, in particular, that assumptions about the worst-case execution times of tasks are correct).

BRIEF DESCRIPTION OF THE DRAWINGS

Particular embodiments of the present invention will now be described with reference to the accompanying drawings, in which.

DETAILED DESCRIPTION OF CERTAIN EMBODIMENTS

The present invention provides a device and method for passively monitoring a processor to detect abnormal behaviour.

In a particular embodiment of the present invention, the target processor comprises a TTC system. In TTC systems, tasks are executed periodically or on a one-shot basis within their scheduled processing times or deadlines. Such tasks are non pre-emptive, meaning that they run to completion once they start. This type of system can be implemented in different architectures, such as a super-loop architecture or a timer-based architecture.

In the timer-based architecture, such as employed in the embodiment of the present invention described below, an interrupt service routine (ISR) is triggered periodically, typically in every tick interval, to update the timing information for all tasks (i.e. to count down to when they are due to run). The ISR also executes tasks that are due to run in that particular tick interval.

As far as the power consumption of such an embedded system is concerned, the system is set to an idle state and waits for the next ISR to occur after tasks have completed their executions in each tick interval.

Some code fragments of such a simple TTC-ISR scheduler are shown below. In this particular example, the 'Update' function in the foreground processing is an ISR. As explained above, the scheduler returns to the background processing to set the system into an idle state after the ISR execution is completed.

| BACKGROUND PROCESSING | FOREGROUND PROCESSING |
|---|---|
| ```
while(1)
{
  Go_To_Sleep( );
}
``` | 10ms timer ```
void Update(void)
{
  Tick_G++;
  switch(Tick_G)
  {
    case 1:
      Task_A( );
      break;
    case 2:
      Task_B( );
      break;
    case 3:
      Task_C();
      Tick_G = 0;
  }
}
``` |

The deadline for completion of a task is set to be less than the tick interval so that the scheduler can be placed in an idle mode before the next ISR is run. In the case where more than one task is run within a tick interval, the total duration of execution of the tasks is also set to be less than the tick interval, i.e. their combined completion deadline is before the end of the tick interval.

Figure 1:
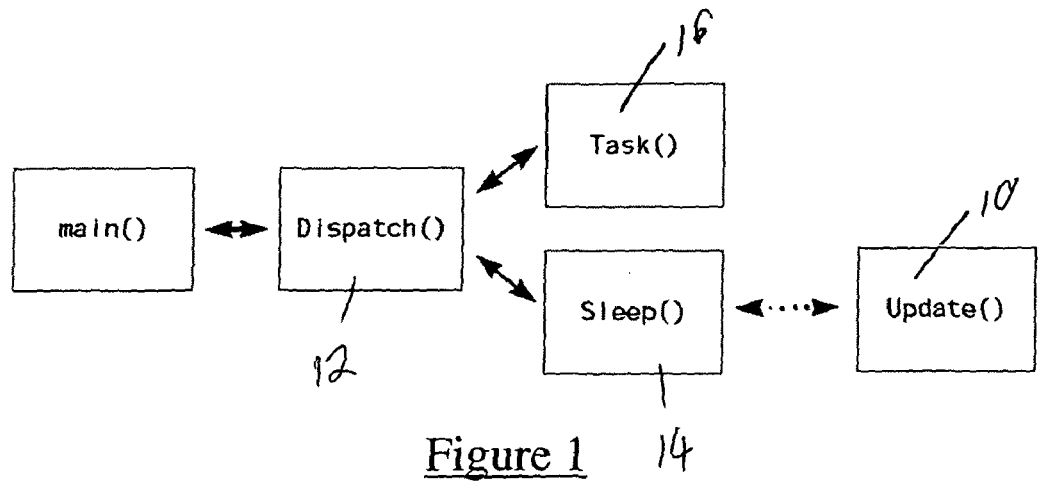
FIG. 1 illustrates operation of a TTC scheduler.

Normal operation of the above TTC scheduler is depicted in FIG. 1. The scheduler starts a timer when it begins to operate. This timer is used for triggering an ISR ('Update' function) 10 at the beginning of each tick interval. As described above, the duty of the ISR is to update a time-related variable of each task in the system task array. It also resets an interrupt flag ready for the ISR. Tasks that are due to run are executed by the function named 'Dispatch' 12 after the completion of the 'Update' 10 function. The 'Dispatch' 12 function invokes the 'Sleep' 14 function to set the system into an idle state if no tasks are scheduled to be executed or when the scheduled tasks 16 have completed their execution. In the idle state, all peripherals are still operational, but the processor activity is halted. Consequently, the power consumption of the processor drops dramatically to a minimal level. When the next tick interval occurs, the ISR wakes up the processor leading to its power consumption radically increasing. The scheduler then continues the next cycle of operations.

In some cases, for example, when a task is scheduled to be executed in a tick interval but fails to complete its execution before its deadline, the task will continue to run until its execution is completed. If such a task execution exceeds its tick interval, the ISR will not complete and so it will not be able to interrupt the running task when the next tick is due. As the processor is continuously running in this case, its power consumption will not drop to a minimal level. Therefore, the monitoring device of the present invention will detect that the system's power consumption is not periodic, as expected, and so a task overrun is likely to have occurred.

In accordance with the above technique, the power consumption of a processor can be monitored to reflect the temporal behaviour in any TTC embedded system that supports timer interrupts and idle modes. Accordingly, the present invention is suitable for detecting task overruns in such systems.

In order to evaluate the method of the present invention, the Applicants set up an experimental platform as described below. The platform consisted of a target system and a monitoring device according to an embodiment of the present invention.

A processor's power consumption over time can be expressed as $P(t)=I(t) \times V(t)$ where P is the power consumed by the processor, I is the current flowing through the processor and V is the potential difference across the processor—all measured at time t. In this particular set up, the change in V in any time t was determined to be insignificant and so V was considered constant. Thus, it was possible to use I(t) to indicate the power consumption of the processor and to extract the temporal behaviour of the target system.

In accordance with the above, a 1Ω sampling resistor was inserted into the target system, in series with the processor's power input. Thus, by measuring the potential difference (V) across the sampling resistor (R), and using Ohm's Law (I=V/R), the current (I) flowing through the processor could be determined. In fact, since a 1Ω resistor was used the value of I(t) at any time t was simply equal to the value of the potential difference V across the resistor.

The target system comprised an Ashling EVAB7 evaluation board mounted with a Philips LPC2106 32-bit microcontroller and a TTC system. The LPC2106 microcontroller contains an ARM7TDMI-S processor and a range of peripherals, such as an I²C serial interface and a Watchdog timer. It also supports an idle mode to halt the processor, as well as an on-chip Phase Locked Loop (PLL) allowing the processor to operate at frequencies from 10 MHz to 60 MHz. The Ashling EVAB7 evaluation board provides two separated power supplies to the microcontroller: a 1.8V supply to the processor and a 3.3V supply to the I/O. In the particular embodiment described, the 1.8V supply to the processor was monitored. However, in other embodiments the power consumed by I/O ports or on-chip components such as ADC converters may be monitored. In this situation the monitored signal may be less clean and may require further processing to enable information about the operation of the system (i.e. the "idle time") to be extracted.

The monitoring system comprised a National Instruments NI PCI-6035E data acquisition (DAQ) card and a software monitoring program implemented using LabVIEW 8. The DAQ card is capable of sampling an analogue signal up to 200 KS/s in 16-bit resolution. It was connected to the sampling resistor through a National Instruments CL-68LP connected block to sample the analogue power signal. A predefined graphical interface, DAQ Assistant, was employed by the monitoring program to configure and communicate with the DAQ card. The data samples obtained by the DAQ card were sent to the monitoring program through the DAQ Assistant. The monitoring program subsequently displayed the raw data graphically, stored the raw data into a data file, analysed the raw data with respect to a user's inputs (such as the duration of a tick interval, sampling rate, and WCET's for each task), and generated and stored an analysis report. According to the sampling rate and the duration of the tick interval input by the user, the monitoring program determined the number of samples to be taken in a tick interval. Note that a preset boundary value, again input by the user, was used for comparison with the data samples to determine whether the target system was running (i.e. value is above or equal to the boundary) or idling (i.e. value is below the boundary). The monitoring program evaluated the system's idle time in a tick interval by counting the number of samples which were below the boundary value in the tick interval. Based on the idle time, the program could easily determine whether a task overran its scheduled processing time or exceeded its worst case execution time (WCET). However, the precision of the idle time is dependent on the frequency of the sampling rate. Accordingly, the sampling rate for this method must be set to an appropriate level to allow the idle time to be determined within the required degree of accuracy.

Note that the monitoring system in this embodiment should be started before the target system. This is because the analyser in the monitoring system assumes that the first arrived data samples are obtained before the scheduler of the target system has started. In order to achieve this, the monitoring system was configured to send a signal to trigger the target system to start shortly after the monitoring system itself was started.

The method was evaluated by performing several tests in two different experiments on the experimental platform. The experiments focused on testing the method's capability to identify if a task overran its scheduled processing time or exceeded its WCET.

Prior to the description of the experiments, the settings of the target system and the monitoring system will be considered. In the monitoring system, the sampling rate was adjusted to 200 KS/s (i.e. 200,000 samples per second) which resulted in a sampling precision of ±0.005 ms. The first 210,000 data samples were recorded. However, the data gathered before the first rising edge was detected by the monitoring system (indicating the start of the first tick interval in the target system) was filtered out when the analysis was performed. It should be noted that the clocks of the target system and the monitoring system were synchronised at the point when the first rising edge was detected. As the duration of each experiment was, short, the clock drift of the target system and the monitoring system was negligible. It was therefore not necessary to re-synchronise the systems. A boundary value of 6 mV was empirically chosen to determine whether the target system was in an idle mode or an executing mode.

In the target system, the processor was set to operate at 29.4912 MHz. The tick interval was set to 1 ms so that 200 samples would be taken in each tick interval. Five different tasks were provided in the target system, as follows:
1. Blinking four LEDS.
2. Reading an I/O port.
3. Reading the real-time clock and storing the current time to a buffer.
4. Sending data in a buffer using UART.
5. Sending data using SPI (Serial Peripheral Interface bus).

Each experiment contained a number of test sets. In each test set, a unique set of parameter values for the tasks were used, such as the value of the periodic run time for each task. These parameter values were updated in both the target system and the monitoring system before a new test took place.

In the first experiment, a WCET of 70% of a tick interval (i.e. 0.7 ms) was chosen for all tasks. In addition, a fixed time delay was added to all tasks after a particular tick interval: this fixed delay had a value from 0 to 90% of the tick interval. With the addition of the fixed delay, tasks might exceed their WCETs but might not overrun their scheduled tick intervals.

In the second experiment, most of the settings from the first experiment were adopted. However, in order to bring this experiment closer to reality the fixed amount of time delay was added at a random time to a selected task in each test. A unique look-up table with a set of random numbers was assigned to each test. Each of the random numbers was associated with a particular tick interval to determine whether the time delay should be added to the selected task running in that tick interval.

The first experiment comprised 480 tests and the second experiment comprised 370 tests. Tasks which exceeded their WCETs or overran their scheduled processing times in the tests were all successfully captured by the monitoring system. Some of the results from these experiments are discussed below.

The First Experiment

Table 1 shows the task information for the target system in one of the test sets selected from the first experiment.

TABLE 1

Task information of a test set in the first experiment

| Task ID | TASK | Start Delay (tick) | Periodic Time (tick) |
|---------|------|--------------------|----------------------|
| T0 | SPI_Update | 1 | 50 |
| T1 | UART1_O_UPDATE | 5 | 75 |
| T2 | Blink_Leds | 0 | 20 |
| T3 | Display_RTC_Update | 10 | 70 |
| T4 | Switch_Read | 7 | 30 |

In this test set, a fixed amount of time delay was added to all task execution times after tick 989. The test was performed three times with respective time delays of 0.7 ms, 0.8 ms and 0.9 ms. The target system's behaviour was captured by the monitoring system and is shown in the graphs of measured voltage verses sample number in FIGS. 2, 3 and 4 for each respective time delay, between ticks 997 and tick 1001.

Figure 2:
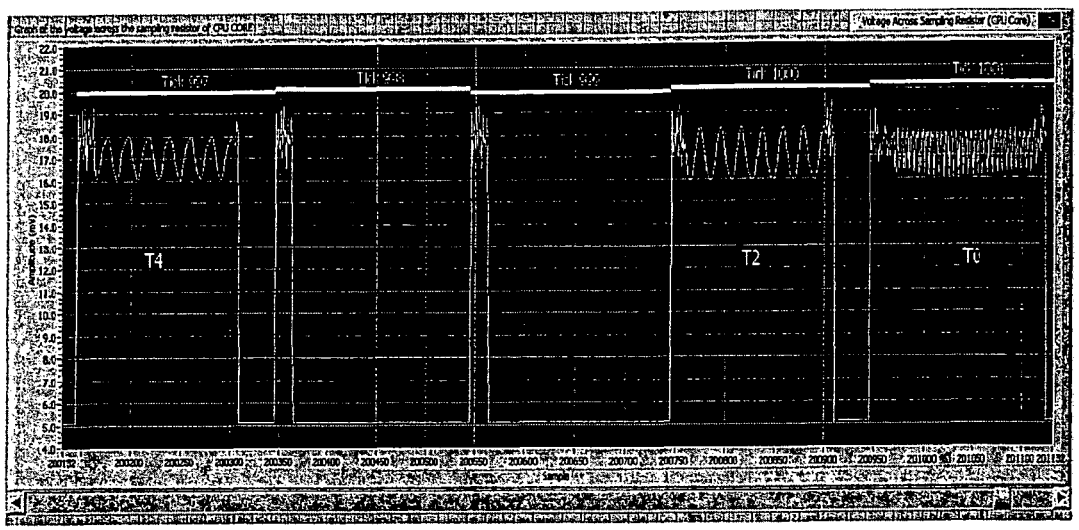
FIG. 2 illustrates experimental test results for an embodiment of the present invention with a 0.7 ms time delay added to all task execution times.

As shown in FIG. 2, T4, T2 and T0 all exceeded their WCETs but completed within their respective tick intervals when the 0.7 ms time delay was added to their execution times. As described previously, a WCET of 0.7 ms was used for all tasks in this experiment.

It can also be seen from FIG. 2 that tick 997 started at the 200147$^{th}$ sample instead of the 199400$^{th}$ sample (calculated using 200 samples per tick). This is due to the pre-sample filtering explained above which resulted from the monitoring system being started before the target system. This situation is also present in FIGS. 3 and 4, since tick 997 started at the 200113$^{th}$ sample in FIG. 3, but in FIG. 4 it started at the 200788$^{th}$ sample.

Figure 3:
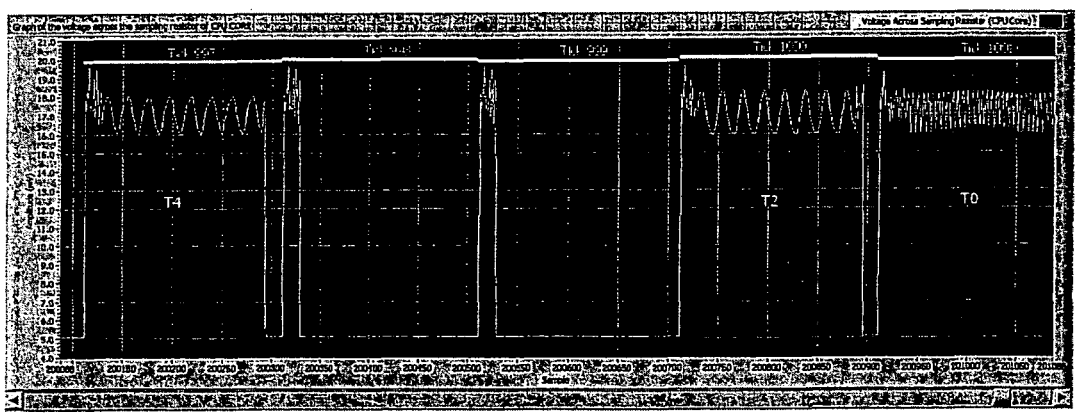
FIG. 3 illustrates experimental test results for an embodiment of the present invention with a 0.8 ms time delay added to all task execution times.

When the time delay was increased to 0.8 ms, as shown in FIG. 3, the tasks T4 and T2 still exceeded their WCETs but completed within the deadline of the tick interval. However, T0 exceeded its WCET by such an amount that it also missed its deadline and overran the tick interval.

Figure 4:
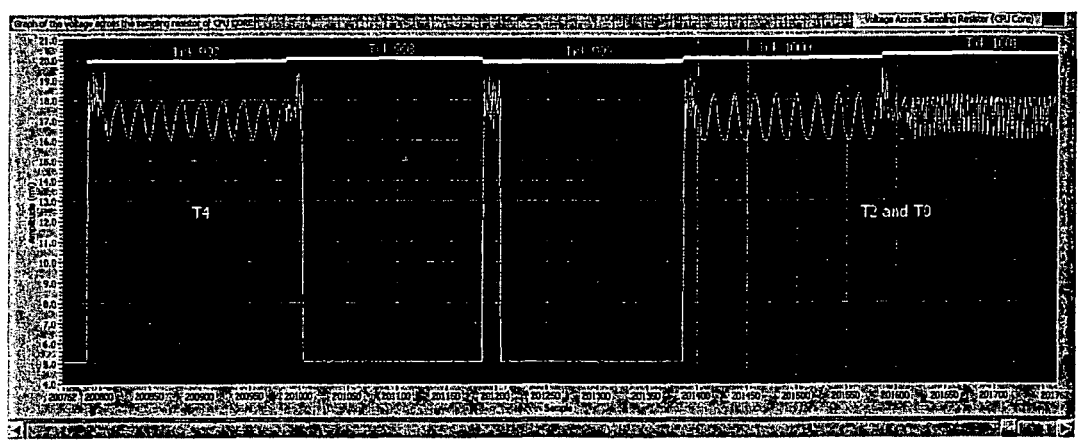
FIG. 4 illustrates experimental test results for an embodiment of the present invention with a 0.9 ms time delay added to all task execution times.

FIG. 4 illustrates the results of the monitoring system when the time delay was increased to 0.9 ms for all tasks. This resulted in all of the executing tasks T4, T2 and T0 missing their deadlines and overrunning their tick intervals. As can be seen this is evident from the fact that the voltage does not drop below its boundary level (6 mV) periodically (i.e. during each tick interval). Accordingly, these task overruns can be detected using this particular embodiment of the present invention.

The Second Experiment

Table 2 shows the task information for the target system in one of the test sets selected from the second experiment.

TABLE 2

Task information of a test set in the second experiment

| Task ID | TASK | Start Delay (tick) | Periodic Time (tick) |
|---|---|---|---|
| T0 | Switch_Read | 1 | 20 |
| T1 | UART1_O_UPDATE | 2 | 60 |
| T2 | SPI_Update | 5 | 35 |
| T3 | Blink_Leds | 15 | 60 |
| T4 | Display_RTC_Update | 20 | 55 |

Figure 5:
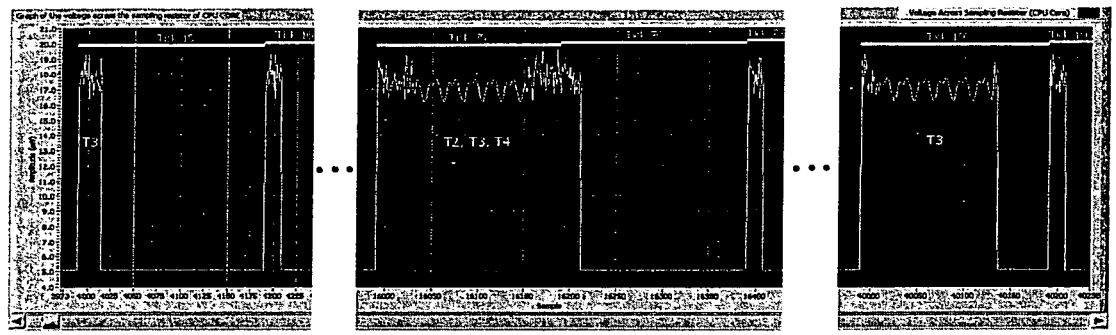
FIG. 5 illustrates experimental test results for an embodiment of the present invention with a 0.6 ms time delay added randomly to the execution time of task 3.
Figure 6:
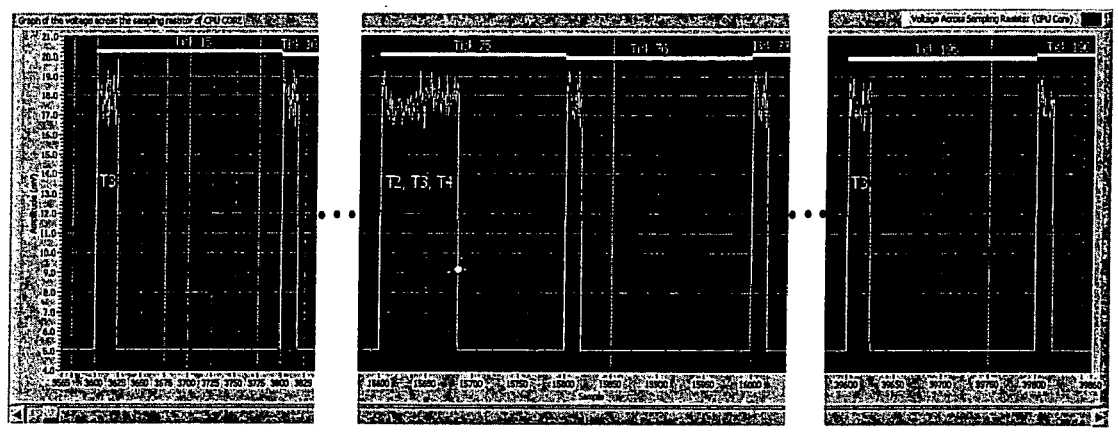
FIG. 6 illustrates experimental test results for an embodiment of the present invention with a 0.8 ms time delay added randomly to the execution time of task 3.

In this test set, T3 was the selected task in which a fixed amount of time delay might be added to its execution time. This was dependent on the random numbers associated with the tick intervals that T3 was scheduled to run in. Two different test results (for 0.6 ms and 0.8 ms time delays), which were captured by the monitoring system, are shown in FIG. 5 and FIG. 6 respectively. In order to permit comparisons to be made, the results from three segments, showing different tick intervals, are displayed for each test. In each of the diagrams the segment on the left shows tick 15 and the beginning part of tick 16, the middle segment shows ticks 75 and 76 and the beginning part of tick 77, and the segment on the right shows tick 195 and the beginning part of tick 196.

In FIG. 5, the left segment shows that T3 executed normally in tick 15 with no time constraint violation. From the middle segment, it can be determined that there was a task overrun in tick 75. The monitoring system reported that there were three tasks (T2, T3 and T4) running in this tick interval. The total duration of their execution clearly exceeded the tick interval and therefore resulted in a tick overrun. The segment on the right shows that T3 exceeded its WCET (0.7 ms) in tick 195 but that it completed its execution before its deadline, that is before the end of the tick interval.

In FIG. 6, T3 again ran normally in tick 15 as shown in the left segment. Unlike in the middle segment of FIG. 5, T2, T3 and T4 did not violate any timing constraints in tick 75 of this test. In tick 195, the segment on the right confirms that T3 executed normally without any timing constraint violation.

Thus, it is possible to determine that in ticks 75 and 195 of the first test (shown in FIG. 6), the time delay was added to T3 but in tick 15 of that test no time delay was added. It is also clear that in the second test (shown in FIG. 6), no time delay was added to T3 in any of the ticks 15, 75 and 195.

Accordingly, the above results demonstrate that the proposed monitoring approach can be used to detect task overruns in TTC embedded systems. Indeed, using LabVIEW in conjunction with a NI PCI-6035E DAQ card is particularly suitable for laboratory experiments, since they permit relatively fast sampling rates and high-resolution results. However, monitoring systems implemented by this scheme may be cost-prohibited in practice. Also, continuing to use a fast sampling rate to obtain high-resolution samples in real-time will require significant computational power which may not be practical in all applications.

Accordingly, the Applicants have devised a practical implementation of the proposed approach, which is aimed at providing a cheap but reliable solution. It is envisaged that such a practical implementation can be used to monitor the target system over its entire lifetime.

In this embodiment of the invention, the hardware of the monitoring system comprised a Keil MCB2100 evaluation board mounted with an ARM7-based LPC2129 32-bit microcontroller. The LPC2129 microcontroller contains an internal 10-bit analogue-to-digital converter (ADC) with a sampling rate of up to 400 KS/s which allows an analogue signal from 0 to 3.3 volts to be measured.

The ADC resolution is therefore 10-bits from 0 to 3.3 V (reference). Hence, there are 1023 units between 0 to 3.3 V. Accordingly, each unit has an approximate value of 3.23 mV.

The difference between the voltage drop (VD) across the sampling resistor when the target system in an idle state (5 mV) and the lowest VD when it is executing (16 mV) is approximately 11 mV. According to the above ADC resolution, 5 mV is considered as 1 unit (<2×3.23 mV) and 16 mV is considered as 4 units (<5×3.23 mV). Between the range of 5 to 16 mV there is therefore only a 3-unit difference. If a boundary value is to separate them, the boundary may be set 1 unit above 5 mV and 2 units below 16 mV or vice versa. Since 1 unit out of 1023 units is very small and can easily be corrupted by noise the ADC resolution in this example was not high enough for use in a reliable system.

To address this problem, a small (low cost) signal-conditioning module 20 was added to the system. The signal-conditioning module 20 amplifies the voltage drop (VD) across the sampling resistor by 10 times (although this may be set to any desired value) before passing it to the ADC. The VD therefore becomes 50 mV when the target system in an idle state (originally 5 mV) and 160 mV when it is executing (originally min. 16 mV). The difference between two states is therefore much larger (110 mV). Accordingly, the current ADC resolution becomes sufficient (34 units are provided between 50-160 mV) for the monitoring system to accurately identify the target system state.

Figure 7:
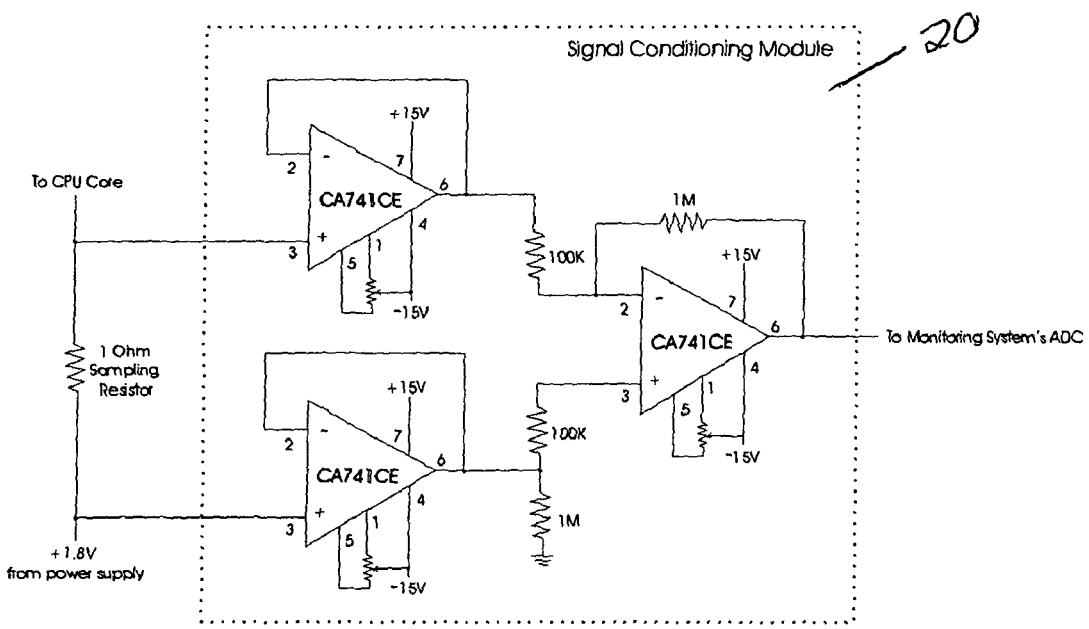
FIG. 7 shows a schematic diagram of a signal conditioning module employed in an embodiment of the present invention.

The signal conditioning module 20 was constructed from three CA7410E operational amplifiers, four resistors and three potentiometers; voltage signals from the two ends of the sampling resistor were amplified (10 times) and subtracted by each other. The resultant signal was subsequently fed to the ADC. FIG. 7 shows a schematic diagram of the signal conditioning module 20. The ADC digitized the signal and compared the current value of the signal with a pre-defined boundary value to determine whether the target system was running or not.

Unlike the experimental implementation described above, the practical monitoring system is required to monitor the target system for as long as possible and to use minimum computational power. As above, the practical monitoring system was configured to start before the target system. After the completion of an initialisation process on the target system, the scheduler on the target system started to run. Simultaneously, the monitoring system was configured to start searching for a rising edge (which indicates that the first tick interval has started in the target system). Once the first rising edge was found, a timer was started but the monitoring system was set into an idle mode. A timer interrupt was generated in every 1/5 of the target system's tick interval to increase a counting variable by 1. When the value of this variable was equal to 4, the monitoring system woke up and started searching for a rising edge again. Once the rising edge was found, the timer restarted immediately. The monitoring system then reset the counting variable and returned to an idle mode. The same operation was executed in the next tick cycle. However, the rising edge could not be found when a task in the target system failed to meet its deadline (i.e. when a tick overrun occurred). In this case, the monitoring system was configured to send a signal to perform a system recovery operation (i.e. to restart the target system).

For the purposes of testing this system, the monitoring system restarted the timer and reset the counting variable when the counting variable reached 5 (i.e. at the end of the target system's tick interval). In addition, the tick interval number was recorded before the monitoring system returned to an idle mode. The recorded tick interval numbers were then sent to the host computer to be stored and displayed at the end of the testing. A 'C' code fragment relating to part of the above procedure is shown below.

found. In addition, the monitoring system did not require sampling over the entire tick interval but instead only sampled over a short period of time at the end of the tick interval. Accordingly, the monitoring system in this embodiment was able to save computational power and memory space, which also means that it can be implemented in a relatively cheap manner.

The experimental tests described above in relation to FIGS. 2 to 6 were used to test the practical monitoring system described above. The monitoring system, however, only monitored exactly 1000 tick intervals (from 0 to 999 ticks) of the target system and the tests only focused on detecting task overruns (i.e. the detection of tasks exceeding their WCETs was not included). As mentioned above, the measured signal in this embodiment was amplified to be 10 times greater than its original value. Accordingly, a boundary value of 80 mV was chosen to distinguish whether the target system was running or in an idle mode.

The same numbers of tests as described above were performed to evaluate the performance of this embodiment (i.e. 480 tests in the $1^{st}$ experiment and 370 tests in the $2^{nd}$ experiment). The results of the present monitoring system implemented by the ARM7 microcontroller were compared with the results of the monitoring system implemented by LabVIEW. As expected, in the first 1000 ticks in each test, any task overruns which occurred in the target system were detected by both of the monitoring systems. Thus, with reference to FIG. 2, no corresponding task overruns were detected in the practical monitoring system, with reference to FIG. 4, a task overrun was detected in the practical monitoring system in tick 997, and with reference to FIG. 5, a task overrun was detected in the practical monitoring system in tick 75.

Thus, overall, a monitoring device according to the present invention allows simple and effective monitoring of a time-triggered system to ensure that faults are detected quickly to enable swift action to be taken to thereby minimise the effects of unpredictable system behaviour.

It will be appreciated by persons skilled in the art that various modifications may be made to the above-described

```
if (ADC_Search_Start_Edge( )) {           // target system's initialisation will be filtered out before searching for
the
                                          // first rising edge and timer0 (for generating interrupt) will start.
   while (Tick_Count_G < MAX_TICK) {      // Sample 1000 target system's tick
      PCON = 1;                           // Monitoring System in idle state and will be woken up by timer0
      if (Inner_Tick_Count_G = = 4) {     // 4/5 of target system's tick interval
         ADC_Search_Rising_Edge ( );      // searching for a rising edge
      }
   }
   MTimers_T0_Stop ( );                   // stop timer0
   if (Tick_Index_G > 0) {                // task overruns detected
      Display_Message ("\nTask Overruns are detected at:\n\0");  // display message heading
      UART1_O_Send_All ( );               // send messages to host computer
      int i;
      for (i=0; i<Tick_Index_G; i++) {
         Display_Data_2 (Error_Tick_G[i]);    // display the recorded tick number
         UART1_O_Send_All ( );                // send to host computer
      }
   }
   else {                                 // no task overruns
      Display_Message ("\nTask Overrun is not detected\n\0");  // display message heading
      UART1_O_Send_All ( );               // send message to host computer
   }
   Display_Message ("- End of operation -\n\0");   // display ending message
```

Thus, in this embodiment, the target system and the monitoring system were synchronised when every rising edge was embodiments without departing from the scope of the present invention. For example, whilst the above discussion has been primarily concerned with a monitoring device for use in TTC embedded systems, the invention is equally applicable to other applications where the system's power consumption can be used to determine whether the system is operating as it should be.

The invention claimed is:

1. A non-invasive monitoring device for detecting task overruns in a processor employing time-triggered co-operative (TTC) scheduling whereby all tasks are configured to run to completion within a pre-determined tick interval and the processor is configured to return to an idle mode before a next tick interval, the device comprising:
 a non-invasive means for monitoring a power consumption of the processor only during a period of time substantially at an end of the tick interval; and
 a means for analysing the power consumption, the means detecting abnormal operation of the processor as a result of task overrun if the monitored power consumption does not periodically fall below a pre-determined minimum level, wherein the monitored power consumption falls below the pre-determined minimum level when the processor is running in the idle mode at the end of the tick interval.

2. The monitoring device according to claim 1 wherein the means for analysing the power consumption is configured to compare a sample power consumption profile with a reference profile.

3. The monitoring device according to claim 2 wherein a trigger is generated to indicate an abnormal operation in response to a mismatch in the comparison.

4. The monitoring device according to claim 3 wherein the trigger is configured to reboot a part of the processor.

5. The monitoring device according to claim 1 further comprising means for alerting a user of abnormal operation.

6. The monitoring device according to claim 1 further comprising means for performing at least one of halting the processor, resetting the processor or initiating a system-recovery operation as a result of detection of abnormal operation.

7. The monitoring device according to claim 1 wherein the power consumed by one or more peripheral components on the processor is monitored to detect abnormal operation.

8. The monitoring device according to claim 1 wherein the means for monitoring the power consumption of the processor comprises means for measuring the potential difference (V) across a known value of resistor (R) when placed in series with the processor's power input; and calculating the current (I) flowing through the processor from I=V/R, whereby a change in current (I) provides an indication of a change in power consumption.

9. The monitoring device according to claim 1 configured for use as a debugging tool.

10. A non-invasive method of detecting task overruns in a processor employing time-triggered co-operative (TTC) scheduling whereby all tasks are configured to run to completion within a pre-determined tick interval and the processor is configured to return to an idle mode before a next tick interval, the method comprising the following steps:
 non-invasive monitoring of a power consumption of the processor only during a period of time substantially at an end of the tick interval; and
 analysing the power consumption in order to detect abnormal operation as a result of task overrun, the abnormal operation being detected if the power consumption does not periodically fall below a pre-determined minimum level, wherein the monitored power consumption falls below the pre-determined minimum level when the processor is running in the idle mode at the end of the tick interval.

* * * * *